United States Patent [19]
Mack et al.

[11] 4,068,115

[45] Jan. 10, 1978

[54] FOOD SERVING TRAY

[75] Inventors: Anthony C. Mack, North Reading; George K. Shumrak, Natick, both of Mass.

[73] Assignee: Sweetheart Plastics, Inc., Wilmington, Mass.

[21] Appl. No.: 596,969

[22] Filed: July 17, 1975

Related U.S. Application Data

[63] Continuation-in-part of Ser. No. 468,404, May 9, 1974, Pat. No. 3,924,100.

[51] Int. Cl.² ............................................. F27D 11/02
[52] U.S. Cl. ...................................... 219/386; 99/447; 126/246; 165/185; 219/439; 219/462; 219/521; 219/530; 219/533; 312/236
[58] Field of Search ............... 219/201, 385, 386, 387, 219/439, 462, 521, 530, 533, 540; 126/246, 375; 165/2, 48, 185; 312/214, 236, 330; 99/447

[56] References Cited

U.S. PATENT DOCUMENTS

| | | | |
|---|---|---|---|
| 3,719,796 | 3/1973 | Abildtrup | 219/462 |
| 3,720,807 | 3/1973 | Ting | 219/441 |
| 3,751,629 | 8/1973 | Eisler | 219/385 X |
| 3,784,787 | 1/1974 | Shelvin | 219/386 |
| 3,875,370 | 4/1975 | Williams | 219/386 |
| 3,908,749 | 9/1975 | Williams | 165/2 |
| 3,924,100 | 12/1975 | Mack et al. | 219/386 |
| 3,965,969 | 6/1974 | Williamson | 219/386 X |
| 4,019,022 | 4/1977 | Seidel | 219/386 |

FOREIGN PATENT DOCUMENTS

| | | | |
|---|---|---|---|
| 72.14352 | 11/1973 | France | 219/386 |
| 72.42967 | 6/1974 | France | 219/386 |
| 1,401,138 | 7/1975 | United Kingdom | 219/386 |

*Primary Examiner*—Volodymyr Y. Mayewsky
*Attorney, Agent, or Firm*—Wolf, Greenfield & Sacks

[57] ABSTRACT

A food serving system for delivering prepared meals to locations remote from the point of preparation, such as to patients in hospitals and nursing homes, which includes a mobile cart having its own low voltage rechargeable power pack that may be utilized to make the cart self powered. The cart has a tier of racks for carrying removable, generally flat, individual, food serving trays. The trays may be disposable or reusable. Each tray is provided with one or more thermally isolated heat transfer devices which may be energized when the tray is placed on a rack in the cart. The trays are constructed to carry conventionally styled, removable dishes, bowls, cups, etc., that may be either disposable or reusable, and the dishes and bowls containing foods to be maintained at a reduced or elevated temperature are placed on the heat transfer devices. The heat transfer devices are intended to maintain the food in the dishes and bowls at the desired serving temperature for extended periods without affecting the temperature of the foods and beverages in other dishes, bowls and cups on the trays, so that when the cart is moved about the hospital they remain at their desired temperatures and the individual trays may be brought to the patients with the different foods and beverages at their separate selected temperatures.

18 Claims, 10 Drawing Figures

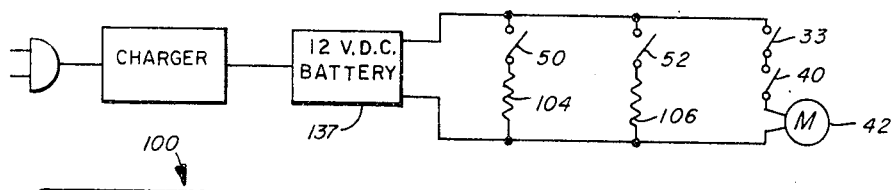
FIG. 10
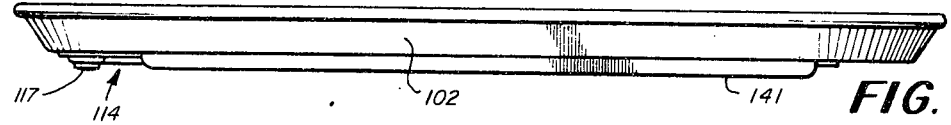
FIG. 5
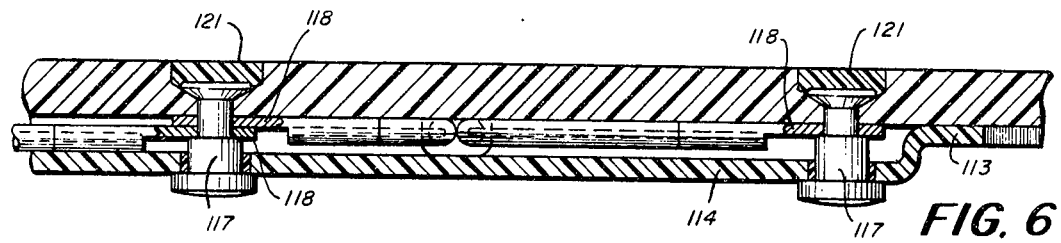
FIG. 6
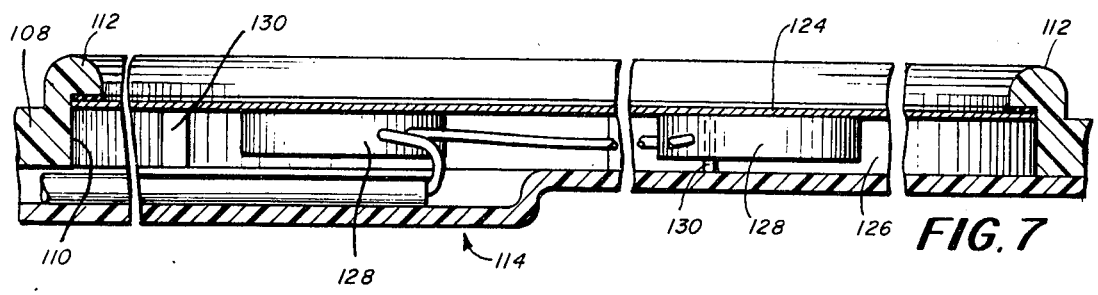
FIG. 7
FIG. 8
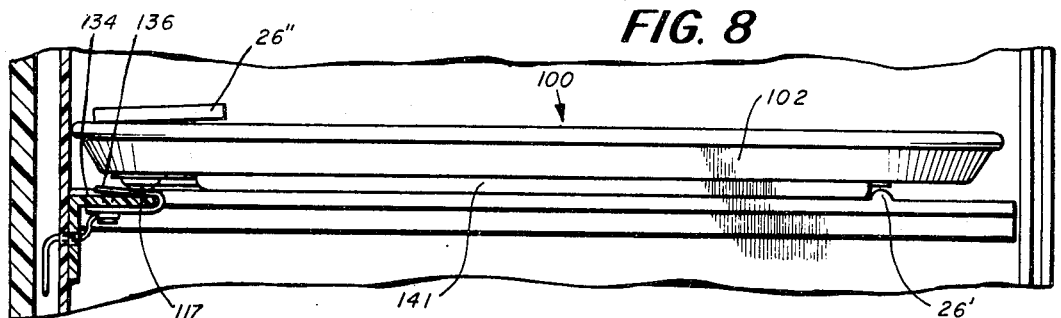
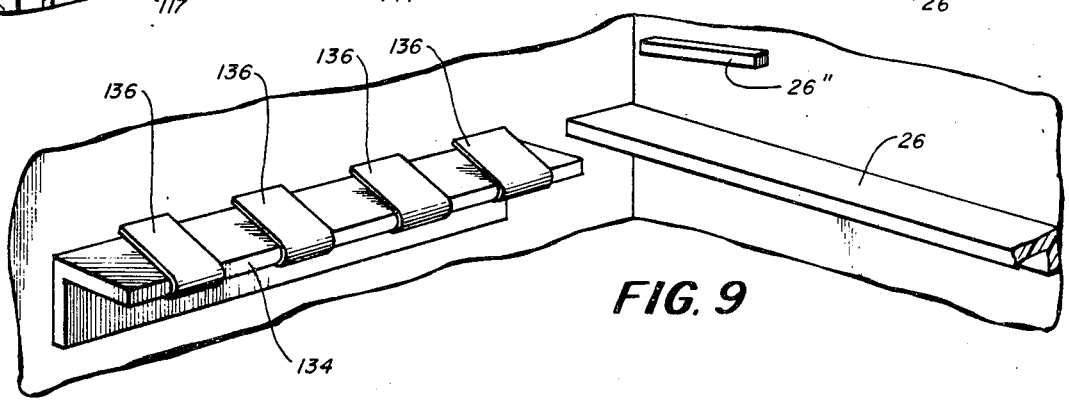
FIG. 9

FOOD SERVING TRAY

RELATED APPLICATION

This application is a continuation-in-part of U.S. patent application Ser. No. 468,404, filed May 9, 1974 and now U.S. Pat. No. 3,924,100 dated Dec. 2, 1975.

INTRODUCTION

This invention relates to the delivery of prepared meals to locations remote from the point of preparation and more particularly comprises a new concept in the feeding of patients in hospitals, nursing homes and other institutions, the feeding of hotel guests in their rooms etc. In the following description the invention is described in terms of its use in a hospital but it is to be borne in mind that the invention has wider applications.

Hospitals use a variety of different systems for serving meals to their patients. These systems generally fall into two categories, frequently identified as centralized and decentralized systems. And the systems in each category include a variety of different techniques intended to bring food to the individual patients at the desired temperature.

In the centralized systems, the food is prepared in a main kitchen where the entire meal is set up on individual patient's trays, and the trays are transported directly to the patients. The heated pellet system, hot and cold cart system, and insulated nestable tray-thermal column system all are categorized in the centralized system of food distribution.

The decentralized systems generally fall into two categories, namely, conventional and microwave systems. In conventional decentralized systems, the food is prepared in central kitchens and transported in bulk to floor pantries on the different hospital floors where the patient's trays are assembled. In the microwave systems, the prepared food is either kept in a freezer or refrigerator, and just prior to its serving, the food is allowed to thaw and is then heated in a microwave oven in the floor pantry. Thereafter it is promptly delivered to the patient.

All of the various centralized and decentralized systems have disadvantages. For example, the pellet systems employ a metal disc preheated to 250°–450° F. as the heat source in the tray to maintain hot food at desired temperature, and the pellets constitute a hazard to the patient and kitchen personnel. If the pellets are overheated, they cause the foods to overcook or dry out. The effective temperature retention time is limited to approximately 45 minutes. And the pellets are heavy and add substantial weight to trays. In hot and cold cart systems, wherein the carts for the trays have separate hot and cold sections, there is a tendency to overcook and dry out the foods in the hot section. Utility outlets are needed in both the kitchen and on the patients' floors, and the carts normally are on current for 7 or 8 hours daily. And they do not generate heat in transit. The carts are difficult to clean and require substantial maintenance, and the carts are costly, heavy and have limited tray capacity. In insulated tray-thermal column systems wherein the trays nest on top of one another so that all the hot foods stack on top of each other and similarly all the cold foods stack on tap of one another to form thermal columns, the trays are bulky, heat is conducted in the tray skins from the hot to the cold columns, and the systems have a limited temperature retention time. Furthermore, without lids on the separate trays, the tray bottoms become soiled from the food in the next lower trays.

In the decentralized systems, labor costs are relatively high as more people are required to operate the systems, food costs are higher because of waste and unauthorized consumption, food odors are created on separate floors because of the floor pantries, and dishwashing noise is created on the floors when china is used.

One important object of this invention is to upgrade the quality of food service. This object is accomplished first by providing a system wherein the food is served at the intended temperature even though the food may have left the point of preparation an extended period of time before it is actually delivered to the patients. Second, the eating experience is enhanced by providing a system wherein the patient is served his food conventionally in separate dishes and bowls rather than in large partitioned unattractive and essentially impersonal trays. In essence the object of this invention is to make the eating experience of patients in institutions as enjoyable as possible. This is in part the result of the wider range of foods available to the hospital (they need not avoid quick cooling food) and the elimination of overheating which destroys both the taste and nutritional value of the food.

To accomplish these and other objects, this invention includes among its features a self-contained mobile cart, separate removable food serving trays for each patient, and individual dishes, plates, bowls, etc. to be carried on the trays and which may be like those used in the home. The cart carries its own rechargeable low voltage power pack, which is designed to supply the necessary energy to each tray to maintain selected portions of the trays that in turn support the dishes containing foods at other than ambient temperature at the desired temperature. The trays include isolated heater transfer devices which comprise a relatively small percentage of the total tray area, and those portions are sized so as to correspond to the size of the dishes containing the foods to be heated or cooled by them. The heat transfer devices do not affect the temperature of the remainder of the tray, and consequently foods not actually on the transfer devices remain at their initial temperatures.

Each tray carries its own contacts that engage terminals on the cart so that the trays and particularly their heater transfer devices may automatically be energized when the trays are mounted on the racks. Preferably the separate dishes, plates, and bowls are disposable, and they have the ability to condut heat between the heat transfer devices and the goods contained in them. When the transfer devices are heaters, the containers must have sufficient stability so as to be capable of being subjected for extended periods to the heat of the heaters without burning or distorting. In order to maximize the efficiency of the heaters, those plates and bowls which are intended to carry hot foods are provided with covers to reduce the heat loss.

These and other objects and features of this invention will be better understood and appreciated from the following detailed description of several embodiments of the food system of this invention, read in connection with the accompanying drawings.

BRIEF FIGURE DESCRIPTION

FIG. 5 is a side elevation of the tray of FIGS. 3 and 4.

Figure 3:
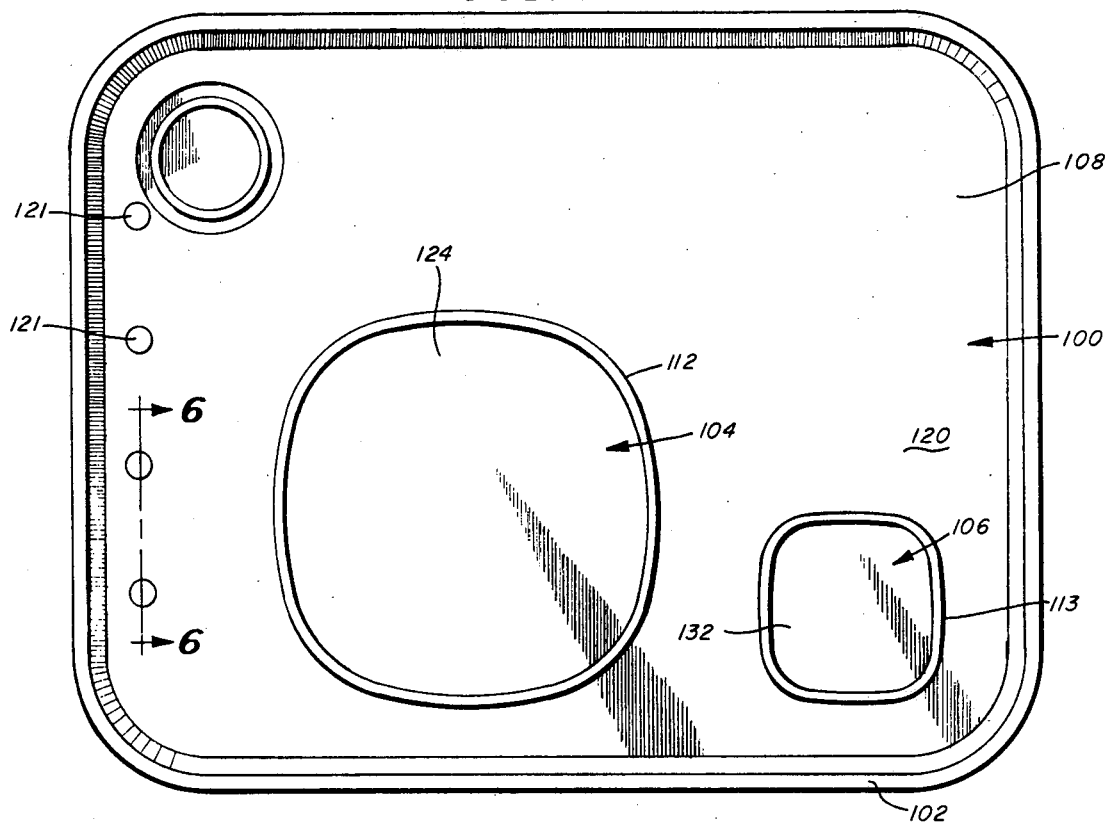
FIG. 3 is a top plan view of a tray constructed in accordance with this invention.
Figure 4:
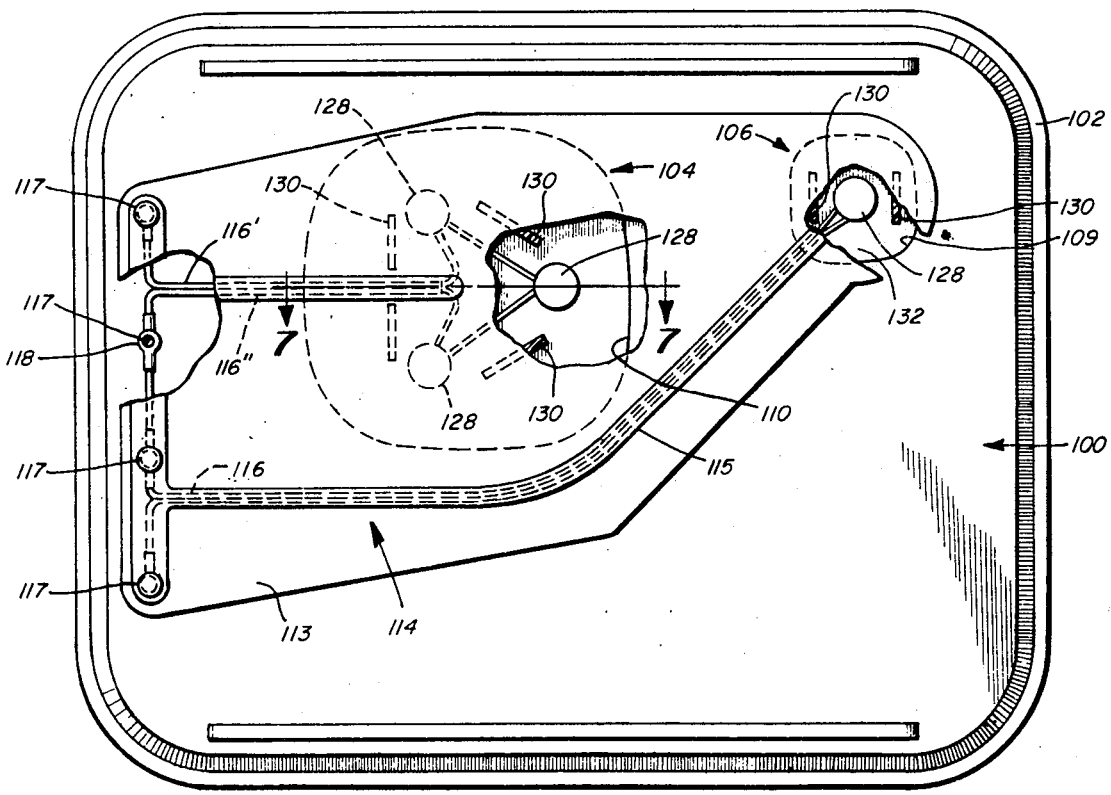
FIG. 4 is a bottom plan view of the tray of FIG. 3 with parts broken away to reveal details of the tray construction.

FIGS. 6 and 7 are cross sectional views of the tray taken along section lines 6—6 and 7—7 of FIGS. 3 and 4 respectively.

Figure 1:
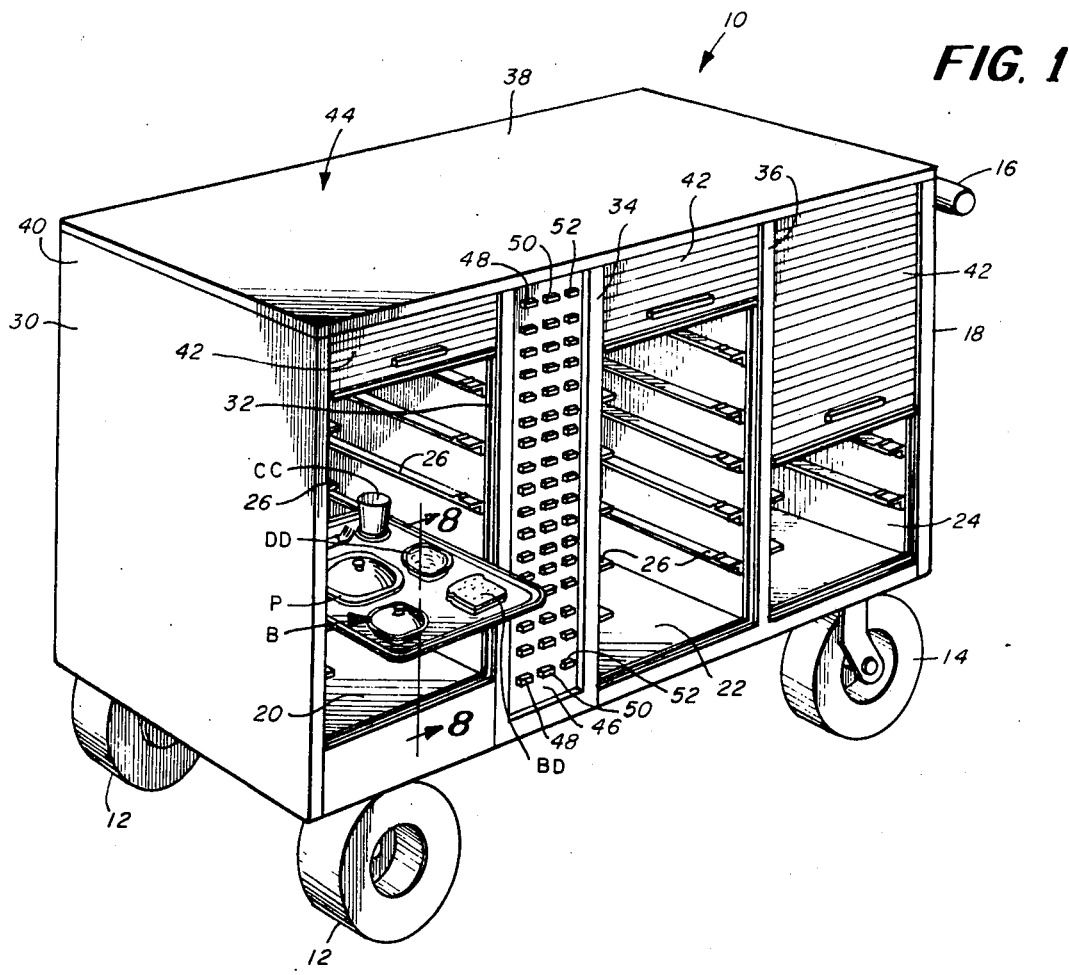
FIG. 1 is a perspective view of a cart and tray of this invention and showing one of a number of food trays that are carried by the cart, partially inserted on its rack.

FIG. 8 is a fragmentary cross-sectional view showing how a tray makes electrical contact with the cart and with the tray fully inserted in the cart and taken along section line 8—8 of FIG. 1.

FIG. 9 is a fragmentary perspective view of the inside of the cart showing the electrical contacts of one rack.

FIG. 10 is a simplified circuit diagram of the electrical components of the cart and tray.

DETAILED DESCRIPTION

In FIG. 1, a single cart 10 is shown, which is designed to move about the floor of the facility employing the feeding system of this invention. The cart illustrated has a pair of fixed axle wheels 12 and a pair of pivotally supported wheels 14 to enable the cart to move freely in any direction. A pair of handles 16 are provided at the top of end panel 18 of the cart for the convenience of the operator.

The cart illustrated is shown to have three separate tray compartments 20, 22 and 24, each subdivided by angles 26 that define separate tiers for the trays to be carried in them. The separate compartments are collectively defined by the bottom wall 28, end panels 18 and 30, partitions 32, 34 and 36, top wall 38, rear panel 40 and sliding doors 42.

A power pack and control circuit section 44 forms part of the cart and is mounted between partitions 32 and 34. The power pack and control circuit contained in the section is designed first to apply the energy needed to energize the spot heat transfer devices on the several trays which may be carried in the tiers within the compartments 20, 22 and 24, and it may serve the additional function of supplying energy to literally drive the cart about the floor. And such an arrangement would of course include means for recharging the power pack from an AC power source. The details of the power pack and control circuit are not part of the present invention.

Figure 2:
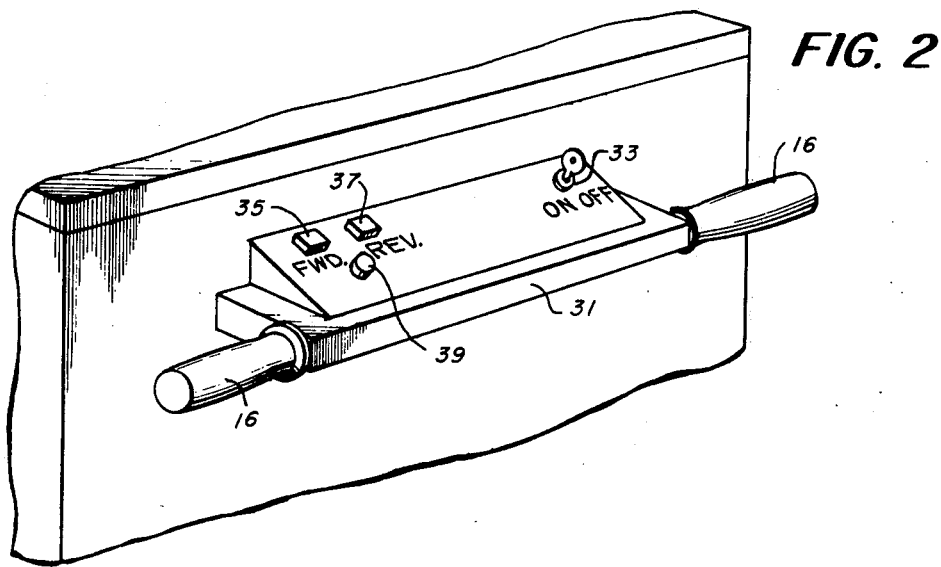
FIG. 2 is a fragmentary perspective view of the cart operating controls.

In FIG. 2 the controls for driving the cart are suggested. The console 31 between handles 16 has a key operated switch 33 for connecting the power pack to the motor 42' (see FIG. 10) for driving wheels 12. Two button operated switches 35 and 37 on console 31 respectively represent forward and reverse button controls for the cart. The operator need only turn the key 33 "on", press the forward or reverse button as desired and squeeze the trigger handles 16 to move the cart about the hospital floor. (Handles 16 have switches 40' [see FIG. 10] built into them which when squeezed complete the motor circuit). Steering of course is made possible by the pivotally mounted wheels 14. Indicator light 39 glows when the battery is being charged.

A heater control logic panel 46 is shown on the front of section 44 and has three columns of push button switches. Each horizontal row of these switches represent the controls for a single tray. The first vertical column of switch buttons 48 are the "off" switches for each of the tray stations, and columns of switch buttons 50 and 52 represent the "on" switches for the two separate heat transfer devices which are independently operated and which are provided in each tray. Of course a different switch arrangement could be used.

In FIGS. 3 to 8, one tray to be used with the cart of FIG. 1 is shown. It will be appreciated that the cart may have any desired capacity (the cart illustrated holds about 18 trays), and the number is not a limitation of this invention. Normally all of the trays used in the cart are identical, and may be used interchangeably on any of the racks in the separate compartments of the cart.

The tray 100 illustrated in the drawing is rectangular in shape and typically may be approximately 14 × 18 inches. Preferably the dimensions of the tray are the same as conventional food serving trays now in use and they are designed so that they may be used as conventional food carrying trays without the activation of their heat transfer devices in cafeterias and other central food serving locations in the facility utilized by ambulatory patients, guest, staff etc.

The tray has an upturned rim 102 which extends about its periphery, and the main body of the tray is made of a high heat distortion, self extinguishing material such as acrylonitrile-butadiene-styrene plastic (ABS) or a copolymer of polystyrene and polyphenylene oxide. The entire exposed upper surface of the tray is made of such a material with the exception of the spot heaters that comprise the heat transfer devices which are incorporated into it, as described in detail below.

In the embodiment shown, two heaters 104 and 106 are provided in the tray, and their total areas together constitute a small percentage of the total tray area. For example, the diameter of heater 104 nay be approximately 7 inches and the diameter of heater 106 may be approximately 4 inches. Of course different members and sizes of heaters may be used in accordance with this invention. In the illustrated configuration the heater 106 would normally be used to heat soup in a bowl placed on the heater, and heater 104 would be used to direct heat to food in the main dinner plate. While the diameters of the heaters 104 and 106 differ from one another, their construction is quite similar as will be evident from the following description.

In the cross sectional view of FIG. 7, the main tray body 108 which forms the horizontal support member of the tray is provided with an opening 110 whose diameter defines the size of the local or spot heater 104. A bead 112 is molded in the support 108 immediately about the opening 110, which bead defines a ring or guide for positioning a plate on heater 104 and inhibits the plate from shifting or sliding off the heater. A similar but smaller opening 109 defines the area of the smaller second heater 106, and it also is surrounded by a bead 113 for positioning a soup bowl on it. A premolded circuit assembly base 114 made of the same or a material similar to the body is secured to the bottom of support 108 and closes the openings 109 and 110. The periphery 143 of the assembly base extends radially beyond the edges of the openings, and it is essential that the base form a proper seal with the body as described in greater detail below so as to make the tray fully immersible. It is preferred that water be prevented from entering the interior of the heaters.

The assembly base shown is provided with a number of shallow channels 115 for receiving the electrical wiring for the two heaters. The conductors 116 are connected to electrical contact rivets 117 that are exposed on the bottom of the base so that they make contact with suitable terminals in the cart which are described in detail below.

As shown in FIG. 6, the contact rivets 117 are connected to the conductors 116 by suitable terminal rings 118 which are crimped or otherwise electrically joined to the rivets. And the tops of the rivets are peaned over the rings to ensure continued contact therewith. The upper ends of the rivets 117 are not exposed on the upper surface 120 of the tray, and if holes are provided through the body they are filled with silicone 121 or some equivalent material to seal the upper surface, as shown in FIG. 6.

The assembly base 114 together with an aluminum disc 124 defines a cavity 126 which houses the operative elements of the heater assembly. The aluminum disc is of sufficient diameter so as to extend under bead 112. A silicone or other sealant under bead 112 is used to preserve the necessary immersible character of the tray. The edge of the base 114 is similarly sealed to the main body of the tray.

The heater 104 includes three positive temperature coefficient (PTC) pellets 128 of the type manufactured by Texas Instrument Company, which are disposed in the cavity 126 and are equally spaced about the bottom of the aluminum disc to which they are bonded. The pellets may be approximately ⅜ inch in diameter and are connected in series to conductors 116' and 116" as shown in FIG. 4. The bottoms of the pellets are spaced from the assembly base 114 so as to form an air gap to prevent the base from becoming uncomfortably hot when the heaters are activated. A number of ribs 130 are provided on base 114 to maintain the gap and prevent sagging or other distortion of aluminum disc 124.

The smaller heater 106 differs from the larger heater 104 only in the number of pellets 128 used. A shown, a single pellet is sufficient to provide the heat necessary for the smaller heater. Like pellets 128 in heater 104, the single pellet of smaller heater 106 is bonded to the bottom of its aluminum disc 132 and ribs 130 serve to space that disc from the base 114 to preserve the gap.

In FIG. 1 a set up tray is shown wherein a soup bowl B is on heater 106, a dinner plate P is on heater 104, and the other normally used side dishes (dessert dish DD and bread and butter dish BD). utensils and napkin, and coffee cup CC are shown. The bowl B and plate P disposed on heaters 106 and 104 respectively may typically be those shown in Design U.S. Pat. No. D229,812 dated Jan. 8, 1974 owned by Sweetheart Plastics, Inc. The bowl and plate may be made of thermoformed sheet material, and each preferably has a bottom wall whose contours conform to that of the aluminum discs to provide a wide face to face contact area with the aluminum discs forming the upper surface of each of the heaters. In the preferred form of this invention the bowl and plate are held in place on the aluminum discs by the beads 112 and 113 which surround them. Customarily tays made up as shown in FIG. 1 with the food, dishes, cutlery, etc. in place are assembled in the cart 10 on each of the racks in the compartments 20, 22 and 24. The angles 26 are disposed in the cart approximately 4½ inches apart so as to provide sufficient space on each angle for a set up tray. It is contemplated that when the food is dished onto the main dinner plate P and the soup is poured in bowl B, they are at the desired temperature for eating, and it is the function of the cart and tray to maintain the food at that temperature for so long as is required to deliver the food to the various patients in the institution. When the set up trays are placed on the angles which comprise the racks in the cart, the electrical connection is made between the rivet contacts 117 on the tray and the mating terminals for each rack in the cart. As shown in FIG. 9, brackets 134 are mounted in the rear of the compartments adjacent each tier as defined by the angles 26. The brackets carry four spring-type terminals 136 which equal in number the rivet contacts 117, and the terminals are positioned automatically to make electrical contact with the rivet contacts on the trays by stops 26' on angles 26 and guide 26" when the respective trays are positioned properly on their angle racks. The ribs 141 on the sides of the tray bottom ensure proper positioning of the tray on the angles in alignement with terminals. The ribs also provide a steady base for the tray by extending below the bottoms of contacts 117. The control board switches 48, 50 and 52 for each rack are connected in circuit with the terminals 136 and power supply 137 and switch 48 (not shown in FIG. 10) turns off both heaters 104 and 106, switch 50 when "on" causes heater 104 to become energized and the other switch 52 when "on" causes heater 106 to become energized. When a tray is placed on the rack the appropriate switches for that rack are actuated so as to supply energy to either or both of the heaters as desired. The loaded cart is then wheeled about the floor to the locations of the various patients where the trays are pulled from the rack individually and given to the patients. For so long as the trays remain in the cart, heat is supplied to the soup and/or entree to maintain the food at the desired temperature. Thus, unlike the prior art feeding systems, there is a continuous source of energy provided to continuously heat the food.

The PTC pellets are basically multi-modal resistance heaters. Below their critical temperature which may range from 120° to 400° F. depending upon composition, they have a low electrical resistance, while above it the resistance is very high. Near the critical temperature, the resistance varies between extremes. Therefore, depending upon temperature a PTC heater will deliver different wattages. If the plate or bowl is colder than intended to cool the PTC heater below its critical temperature, the heater will operate at a high wattage which will in turn quickly heat the bowl or plate on it and of course the PTC material will become hot. Ultimately the wattage will decrease and the system will come into equilibrium. At equilibrium the heater will operate at just enough wattage to keep the food warm without overcooking it. Preferably heated food is maintained on the trays at a temperature in the range of from 130° to 170° F. and most preferably 140° to 160° F., in order to prevent overcooking and to avoid a tendency to develop high bacteria counts in relatively short time periods.

The characteristics of PTC heaters may be utilized not merely to maintain the temperature of hot foods as described above, but also to reconstitute cold food to the desired serving temperature. A cold dinner plate for example at a temperature of 40° F. placed on heater 104 may be heated to the 140°–150° F. range in less then 1 hour. Such a system thus will enable institutions to buy frozen meals from independent food preparing firms and eliminate its own cooking facilities. Essentially the establishment utilizing the system would set up the tray with cold food and after a prescribed period the reconstituted food would be delivered to the patient. It is within the scope of this invention that the cart could during the initial heating period be connected to line voltage through a transformer and then during the delivery period be switched to its own power pack.

While in the preferred form of this invention PTC pellet heaters are utilized as the heat source, it should be appreciated that other heaters may be used such as resistance heaters. Some of these are so inexpensive that they may be considered disposable, and if the tray is made of inexpensive materials, such as corrugated or low cost plastic the entire tray could be disposable. Printed circuit heaters as well as foil heaters of the type shown in U.S. Pat. No. 3,397,301 fall within the class of resistance heaters contemplated. These heaters get hot when electric current is passed through them. These heaters provide a fixed amount of heat, assuming that the voltage source is fixed. To control the heat output of resistance heaters a thermostat may be used to turn the heaters on and off at selected low and high temperature levels. Thus a resistance heater and thermostat combination may be used in place of the PTC pellets of the preferred form of this invention.

It is contemplated within the scope of this invention that each patient may himself have a special tray support which has an electrical terminal adapted to connect with the contact rivets on the tray to further energize the heaters 104 and 106 to continue to maintain the food at the desired temperature when at the patient's station. In this connection, it will be noted that in the preferred form, both the bowl B and plate P are provided with covers so as to better retain the heat generated through the introduction of heat from the spot heaters to the food.

It will be appreciated from the foregoing description that because of the localized nature of the heaters, the heat generated by them will not elevate the temperature of other foods on the tray either in separate dishes or on the tray surface 120. For example, a cup containing a cold beverage will not be warmed by the heaters, not will the butter on the bread dish BD melt because of the generation of heat at the heaters 104 and 106. Furthermore, the dessert dish DD which may contain Jello or some other cold food will not be subjected to heat from heaters 104 and 106 and consequently the dessert will also remain at the desired temperature.

Because the heat is transmitted by conduction from the heaters to the foods in the dishes or bowls on them, little or no loss of efficiency will occur in the heating process even with the introduction of a fan or other air circulator which would prevent a build up of heat, food odors and condensation in the compartments of the cart. This circulation will assist in maintaining the lower temperatures of the other foods by preventing an increase in the ambient temperature.

From the foregoing description it will be appreciated that the advantages sought by the present invention are achieved. Of particular importance is the fact that the food may be served to the patient in conventional dishes and bowls so that the patient need not be made to feel "different". The trays themselves although internally markedly different from trays heretofore used do not have a "foreign" or strange appearance. And of primary importance is the fact that the food is served to the patient at the desired temperature. And while in the foregoing description the use of plastic dishes and plates is suggested it should be appreciated that regular chinware or glassware may be used with equal facility, albeit the added expense of washing is introduced.

It should also be appreciated that the tray may be decorated by coloring, texturing or printing so as to make them most attractive. The aluminum discs can be porcelainized or enameled so as to match or contrast with the main tray body 108. And the heaters in no way interfere with any other functional feature that may be advantageously incorporated into the tray.

While the cart is described as having a control panel 46 with button actuated switches for the heaters, it will be appreciated that the heaters could be made to operate automatically without the usual manually operated buttons. For example, a thermostatic element could be positioned at the aluminum disc and sense the temperature of a cold or hot dish placed on the disc, and open or close the heater circuits as desired.

Because numerous modifications may be made of this invention without departing from its spirit, we do not intend to limit the scope of this invention to the embodiments illustrated and described. Rather, it is intended that the scope of this invention be determined by the appended claims and their equivalents.

What is claimed is:

1. A food serving tray comprising
   a horizontal support comprising a thermally and electrically insulating material and an upturned edge portion,
   an opening in the support generally corresponding in size to the bottom surface of a food container,
   a circuit assembly base secured to the bottom of the support and aligned with the opening,
   a disc on the tray made of good heat conductive material and generally conforming in shape to the opening and aligned with the opening, said disc and base forming a closed cavity in the tray with the disc forming a portion of a top surface of said tray and being secured to the tray,
   an electric heating element secured to the tray in the cavity and in contact with the bottom surface of the heat conductive disc and with its bottom spaced from the base and lying in the cavity,
   and electrical contacts in the tray and electrically connected to the electric heating element by conductors in the cavity for carrying energy to the electric heating element to energize it.

2. A tray as defined in claim 1 further characterized by
   said electrical heating element being a positive temperature coefficient heater.

3. A tray as described in claim 2 further characterized by
   a rib in the upper surface of the tray adjacent the edge of the opening for defining the periphery of the heated area of the tray and for retaining a food container on the support in contact with the disc.

4. A tray as descrbied in claim 3 further characterized by
   said disc being made of aluminum.

5. A tray as described in claim 2 further characterized by
   said base and disc sealing the electrical heating element in the tray so that it may be immersed in water for washing.

6. A food serving tray comprising
   a support comprising thermally and electrically insulating material,
   means defining a localized area in the surface of the support made of a good heat conductive material and fixed in position on said support, portions of the support surrounding the localized area inhibiting the lateral transfer of heat from the localized area to other portions of the support, an electrical heating element secured to the tray located in a cavity defined by said support and in heat transfer contact with the means defining the localized area while being insulated from said suppport, and electrical contacts in the tray and electrically connected to the electric heating element for energizing said electric heating element, said electric heating element being sealed in said tray so that it may be immersed in water for washing.

7. A tray as defined in claim 6 and further comprising, means contacting the localized area for retaining food in heat exchange relationship with said area.

8. A tray as defined in claim 7 further characterized by said means contacting the localized area being rims for containing a food dish separate from the tray.

9. A food serving tray in accordance with claim 6 further characterized by said electric heating element being capable of heating foods held on the tray at a temperature in the range of from 130° to 170° F.

10. A food serving tray in accordance with claim 6 further characterized by said electric heating element being capable of heating foods held on the tray at a temperature in the range of from 140° to 160° F.

11. An immersible serving and food temperature controlling tray structure comprising:

a tray body of thermally and electrically insulating material having a top layer for receiving food containers and a bottom layer;

at least one heat exchange surface portion of thermally conductive material integrally set and sealed in said top layer;

peripheral boss means surrounding said heat exchange surface portion for conformally receiving and indexing a food container over said heat exchange surface portion and substantially preventing lateral movement of said container on said top layer;

a sealed cavity defined in said tray between said top and bottom layers thereof;

an electric heating element secured to the tray in said cavity juxtaposed with the underside of said heat exchange surface portion and spaced from said bottom layer to minimize the transfer of heat through said bottom layer;

exposed contact means sealed in said tray for connection to a source of electric power; and connector means extending from said contact means through said tray between said top and bottom layers and into said sealed cavity to said electric heating element.

12. The invention defined in claim 11, wherein:

said tray body is comprised of plastic material; and said heat exchange surface portion comprises a metallic sheet.

13. The invention defined in claim 11, wherein said peripheral boss means comprises an upstanding continuous ridge of thermal insulating material integral with said top layer and defining a receiving socket for a conformally shaped food container.

14. The invention defined in claim 11, wherein said electric heating element comprises heater means for maintaining a predetermined temperature in a food container placed on said heat exchange surface.

15. The invention defined in claim 14, wherein said heating element is a positive temperature coefficient electric heating element.

16. A food serving tray for a plurality of food products in a like plurality of containers mounted on said tray, comprising:

heat exchange surface portions on said tray for conformally receiving selected ones of said containers;

electric heating elements secured to the tray with at least one element substantially contacting the bottom surface of each heat exchange surface portion for maintaining predetermined temperatures within said containers on said surface portions;

said heat exchange surface portions being thermally and electrically isolated from the remainder of said tray means; and means integral with said tray means for connecting said electrical heating elements with a source of power external to said tray means to energize said electrical heating elements, said heat exchange elements being sealed in said tray means so that said tray means can be washed in water.

17. The food serving tray as defined in claim 16, wherein said electric heating elements and said surface portions form heater means for maintaining respectively predetermined temperatures in respectively selected ones of said food containers.

18. The food serving tray defined in claim 17, wherein said electric heating elements comprise positive temperature coefficient electric heaters.

* * * * *